July 2, 1929.  J. A. H. BARKEIJ  1,719,817
VACUUM FEED SYSTEM
Filed March 22, 1926
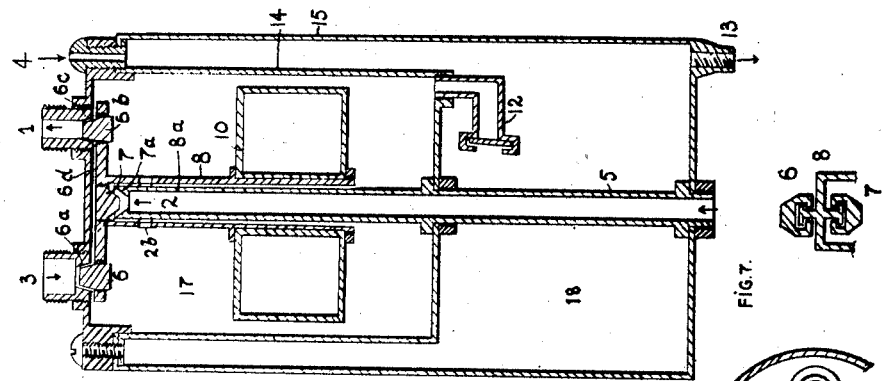
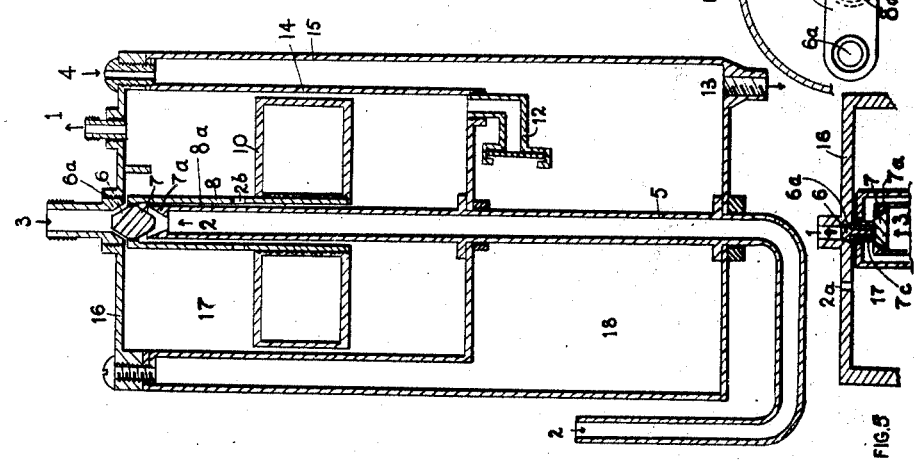
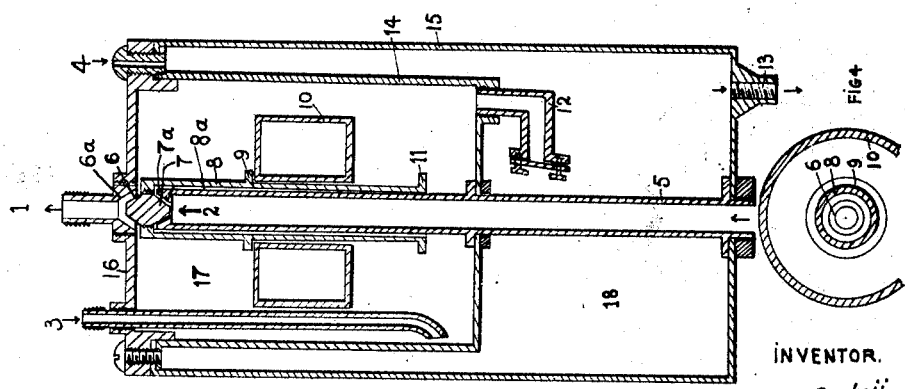
INVENTOR.
J.A.H.Barkeij Patented July 2, 1929.

1,719,817

UNITED STATES PATENT OFFICE.

JEAN A. H. BARKEIJ, OF LOS ANGELES, CALIFORNIA.

VACUUM FEED SYSTEM.

Application filed March 22, 1926. Serial No. 96,526.

My first object is to place two openings diametrically opposite each other by means of a tube through the bottom of the receiving chamber approaching the opening in the cover of the receiving chamber.

My second object is to provide for a sudden change between the normal and subnormal atmospheric pressure condition.

My third object is to close the fuel inlet simultaneously with the vacuum connection in order to prevent the fuel in the delivery pipe from going back to the storage tank, thereby eliminating an automatic valve, which could have the same function.

My fourth object is to make a substantial, simple construction.

My fifth object is to have instantaneous operation if the receiving chamber is empty.

Realizing that the present invention may be embodied in constructions other than those specifically shown and described, I desire that the disclosure herewith shall be considered as illustrative and not in a limiting sense.

Figs. 1, 2, 3 are transverse sectional views of a vacuum device illustrating the position of the vacuum connection, air connection, fuel inlet connection for the receiving chamber and atmospheric pressure connection for the feed chamber.

Fig. 4 is a horizontal section of Fig. 1.

Fig. 5 is a transverse sectional view of the top part of one of said two chambers, the vacuum chamber, having a vacuum connection in the cover of the chamber and the fuel connection in said central tube through the bottom of both chambers.

Fig. 6 is a top view of the device of Fig. 3.

Fig. 7 shows a construction of the two opposite valves whereby the axes of said valves may be parallel to each other instead of aligned.

In the figures, 1 is the vacuum connection, 2 is the air connection, 3 is the liquid connection, 4 is the atmospheric connection for the feed chamber. 5 is the pipe extending through the receiving chamber and through the feed chamber if the latter is located below the receiving chamber. 6 is the upper valve, 6ª the seat in the cover for this valve, 7 is the lower valve, 7ª is a seat for valve 7 in the pipe 5.

8 is a tubular member connected with the valves 6 and 7 and connected rigidly or operatively with the float 10. In the latter case the tube 8 is provided with two stops for a high and a low level for opening and closing the valves at determined levels of the fluid. 12 is a conduit and a flap valve between the receiving and feed chamber. 14 is the vacuum or receiving chamber. 15 is the feed chamber, 16 is the cover for both of them.

The operation of the device in Fig. 1 is as follows. The position of the vacuum and air inlet are diametrically opposite each other and they are in Fig. 1 separated from each other by a layer of liquid between the tubular member 8 and the pipe 5. If the liquid is rising, the float hits the stop 9 and lifts the valve 7 from its seat 7ª and the impetus of the inrushing air helps the buoyancy of the float to close the vacuum valve 6 suddenly and quickly, the air has to pass the entire length between the pipe 5 and the sleeve 8, to enter the vacuum chamber adjacent flange 11. Conversely when the liquid is discharging, the float hits the stop 11 and the air, caught in the passage 8ª between the two tubes, acts as a cushion. Vacuum becomes effective and the liquid rushes through the pipe 3. If a rotary action is wanted to eliminate dirt on the seat of the valves, the pipe can be bent at an angle towards the wall. The liquid rises and the vacuum connection is closed again. If the tubular member 8 is provided with an air hole 2ᵇ near its upper end as shown in Fig. 3, the air will not enter the fluid, but enter directly the space above, thus producing more quickly an atmospheric pressure. The air connection can be extended upwardly as in Fig. 2 to prevent an eventual loss of fluid. The float is slidable upon the tubular member 8 and closes the valves by means of the stops 9 and 11. If the float is connected rigidly to 8 as shown in Figs. 2 and 3, then the opening and closing of the valves will take place more often and the feed chamber can be done away with and replaced by a broad feed pipe to the carburetor.

Fig. 2 shows that the float closes the fuel inlet, if the level of the liquid in the receiving chamber is high enough, and closes the air valve if the level is low enough. The inrushing air has a tendency to close the liquid valve and the pressure of the liquid column above the valve has a tendency to close the air valve, the buoyancy of the float has to decide which pressure will win.

The float 10 is shown rigidly connected to the valves in Fig. 2. but the slidable connection of Fig. 1 can be also applied and likewise the air hole 2ᵇ may be eliminated.

Fig. 3 shows the following operation. The float operates upon the vacuum and air valves simultaneously and upon the liquid valve to prevent a running back towards the storage tank by gravity, after atmospheric pressure is reestablished. In this arrangement the liquid pressure and the air pressure are in opposite direction. The liquid tends to open the vacuum valve and the air tends to close this valve. These two pressures compensate each other more or less. The same variation concerning the air hole 2ᵇ can be applied here.

Fig. 4 shows a sectional top view of Fig. 1.

Fig. 5 shows a variation of the valve construction together with a closing of the liquid connection.

The level of the liquid tends to close the suction connection in the top of the chamber simultaneously with the liquid connection in the central tube 5. The continuous open air vent 2ᵃ serves to drain the liquid from the chamber 17 when the suction connection is closed. When this connection is open the air from said air vent streams into the suction connection. This air stream is interrupted by the opening and closing of the vacuum connection, in contrast with the arrangement in my copending application No. 44,129, filed July 16, 1925, where the communication between these two connections is permanent.

The valves have sloping edges in the same direction and they both close simultaneously. To prevent any leakage the two valves can be made movable with respect to each other by making the valve 6 slidable in valve 7 with a light compression spring in order to compensate for an eventual difference in distance between the valves and their respective seats.

Fig. 6 shows a sectional view of the top of Fig. 3.

Fig. 7 shows that the two valves can be attached movably on the tubular member 8 to insure a proper seating of the valves in the centers of the seats 6ᵃ and 7ᵃ.

Reviewing the four arrangements shown: Fig. 1 shows the vacuum connection above the air connection. Fig. 2 shows the fuel connection above the air connection. Fig. 3 shows the vacuum connection above the air connection as in Fig. 1 and the fuel connection in the same horizontal plane as the vacuum connection. Fig. 5 shows the vacuum connection above the liquid connection. They all use the arrangement of the diametrically opposed valves with a central tube.

Modifications concerning these four types can be easily made, especially the operative connection between the float and the valves, and it is further understood that the air connection 2ᵃ of Fig. 5 may be applied on any of the arrangements shown in the other figures.

In Figs. 1 and 3 the communication with the vacuum connection would be intermittent, in Fig. 2 continuous.

The location of the valves in a single vertical plane facilitate the operation of the valves to a great extent, and insures an easy manufacture and adjustment of the different constituent parts. The possibility of the application of said systems on hydraulic apparatus is understood and supposed to be included in the spirit of the invention.

I claim:

1. In a vacuum feed system, a vessel forming a vacuum feed chamber with a liquid inlet connection, a liquid outlet connection, a vacuum connection, an atmospheric connection in a central tube through the bottom of said chamber and extending above the level of the liquid in said chamber, a valve seat on the top of said central atmospheric tube, means actuated by a float to alternately open and close said atmospheric connection.

2. In a vacuum feed system, a vessel forming a vacuum chamber with liquid inlet, outlet, and vacuum connections, an atmospheric connection in a central tube through the bottom of said chamber and extending above the level of the liquid in said chamber, means actuated by a float to alternately close and open said vacuum and atmospheric connections.

3. The apparatus or system described in claim 1 in which said central tube is encompassed by a second tube carrying an upper and a lower valve to close said atmospheric connection when the level of the liquid is low and to close said vacuum connection when the level is high, said tube actuated by said float.

4. The system as set forth in claim 2 in which said central tube is encompassed by a second tube carrying valves to open and close said vacuum and atmospheric connections, said float operatively connected with said second tube to open and close said vacuum and atmospheric connection alternately.

5. In a vacuum feed system, a vessel forming a vacuum feed chamber with a liquid inlet connection, an outlet connection, a vacuum connection, an atmospheric connection in a central tube through the bottom of said chamber and extending above the level of the liquid in said chamber during its operation, means to close said atmospheric connection when the liquid level is low and to open it when the liquid level is high.

6. In a vacuum feed system, a vessel forming a vacuum feed chamber with liquid inlet and outlet connections, a vacuum connection in the top of said chamber, an atmospheric connection in a central tube through the bottom of said chamber and extending above the level of the liquid during its operation, means to close said vacuum connection when the liquid level is high and to open it when it is low.

7. The system as described in claim 1 in which said means consist of a second tube encompassing said central tube, carrying a valve to open and close said atmospheric connection, said second tube extending below the level of the liquid during its operation.

8. The system of claim 2 in which said means consist of a second tube encompassing said central tube, said second tube connected with valves to close and open said vacuum and atmospheric connections, said second tube extending below the level of the liquid during the operation of said vessel.

9. The system of claim 5 in which said means consist of a second tube encompassing said central tube, said second tube carrying a valve to open and close said atmospheric connection as explained, said second tube extending below the level of the liquid during the operation of this vessel.

10. The system of claim 6 in which said means consist of a second tube carrying a valve to open and close said vacuum connection as explained, said second tube extending below the level of the liquid during the operation of this vessel.

J. A. H. BARKEIJ.